(12) United States Patent
Hunter et al.

(10) Patent No.: US 8,072,504 B2
(45) Date of Patent: Dec. 6, 2011

(54) METHOD AND SYSTEM FOR AIDING USER ALIGNMENT FOR CAPTURING PARTIALLY OVERLAPPING DIGITAL IMAGES

(75) Inventors: Gregory M. Hunter, San Jose, CA (US); Todd Sachs, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 592 days.

(21) Appl. No.: 12/230,310

(22) Filed: Aug. 27, 2008

(65) Prior Publication Data
US 2010/0053353 A1    Mar. 4, 2010

(51) Int. Cl.
H04N 5/228    (2006.01)
(52) U.S. Cl. .................. 348/222.1; 348/218.1; 348/262; 382/284; 382/294; 358/450
(58) Field of Classification Search ............... 348/222.1, 348/207.99–376; 382/284, 294; 358/450
See application file for complete search history.

(56) References Cited

U.S. PATENT DOCUMENTS

| | | | |
|---|---|---|---|
| 6,041,361 A * | 3/2000 | Wilson et al. ................... | 709/253 |
| 6,310,650 B1 | 10/2001 | Johnson et al. | |
| 6,681,056 B1 | 1/2004 | Tseng et al. | |
| 7,024,054 B2 * | 4/2006 | Cahill et al. ................... | 382/294 |
| 7,162,102 B2 | 1/2007 | Cahill et al. | |
| 7,239,805 B2 | 7/2007 | Uyttendaele et al. | |
| 7,289,147 B2 | 10/2007 | Webb | |
| 2003/0063208 A1 * | 4/2003 | Kazami ..................... | 348/333.13 |
| 2003/0184778 A1 * | 10/2003 | Chiba ............................ | 358/1.9 |
| 2004/0218833 A1 * | 11/2004 | Ejiri et al. ..................... | 382/284 |
| 2005/0088534 A1 * | 4/2005 | Shen et al. ................. | 348/218.1 |
| 2005/0140809 A1 * | 6/2005 | Lim ......................... | 348/333.01 |
| 2006/0050152 A1 * | 3/2006 | Rai et al. ................... | 348/218.1 |
| 2006/0072176 A1 | 4/2006 | Silverstein et al. | |
| 2006/0115181 A1 | 6/2006 | Deng et al. | |
| 2006/0115182 A1 | 6/2006 | Deng et al. | |
| 2006/0181619 A1 * | 8/2006 | Liow et al. ................... | 348/239 |
| 2006/0187234 A1 * | 8/2006 | Deng et al. ................... | 345/592 |
| 2006/0239571 A1 * | 10/2006 | Dong et al. ................... | 382/236 |
| 2007/0146530 A1 * | 6/2007 | Nose ........................... | 348/335 |
| 2007/0242940 A1 * | 10/2007 | Yumiki et al. ................. | 396/79 |
| 2008/0074489 A1 * | 3/2008 | Zhang et al. .................. | 348/36 |
| 2008/0211942 A1 * | 9/2008 | Kosover et al. ............... | 348/294 |

FOREIGN PATENT DOCUMENTS
GB    2 262 680    6/1993

OTHER PUBLICATIONS

Tsai, Chia-Ling et al., "A Correspondence-Based Software Toolkit for Image Registration".
"What is Panorama Photography?", 2005 Hewlett-Packard Dev. Co. (Brochure).

* cited by examiner

*Primary Examiner* — Tuan Ho
*Assistant Examiner* — Kent Wang
(74) *Attorney, Agent, or Firm* — Dickstein Shapiro LLP

(57) ABSTRACT

A method and system for aiding user alignment of two or more partially overlapping digital images. A first image is captured. A portion of a first image is displayed with a preview of a portion of a second image. The second image is adjusted by movement of an used to capture the first image and generate the preview of the second image). Once satisfactory alignment is achieved, the second image is captured.

32 Claims, 9 Drawing Sheets

METHOD AND SYSTEM FOR AIDING USER ALIGNMENT FOR CAPTURING PARTIALLY OVERLAPPING DIGITAL IMAGES

FIELD OF THE INVENTION

The disclosed embodiments relate generally to digital imaging and, more particularly, to methods and systems for aiding user alignment for capturing partially overlapping digital images.

BACKGROUND

Solid state imagers typically consist of an array of pixel cells containing photosensors. Each pixel cell produces a signal corresponding to the intensity of light impinging on its photosensor when an image of a scene is focused on the array by one or more lenses. These signals may be stored in a memory and displayed on a monitor, manipulated by software, printed, or otherwise used to provide information about the scene.

Several kinds of imagers are generally known. Complementary metal-oxide-semiconductor ("CMOS") imagers and charge coupled device ("CCD") imagers are among the most common. CMOS imagers are discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, which are all assigned to Micron Technology, Inc.

To image a large scene (e.g., a panorama scene), a plurality of smaller images can be captured and later stitched together using software. FIG. 1 depicts an arrangement of three smaller images 101, 102, 103 which can be combined to form a larger composite image. The overlap areas 104, 105 of the smaller images are shaded with diagonal lines. Overlap area 104 corresponds to an area of the scene included in both image 101 and image 102. Similarly, overlap area 105 corresponds to an area of the scene included in both image 102 and image 103.

Smaller images must be carefully aligned to yield a satisfactory composite image. For example and again with reference to FIG. 1, if image 101 were not aligned with image 102, then an abrupt transition would be evident within overlap area 104 and image compositing software would have a difficult time properly stitching the images together. Conventionally, images are aligned to form a larger composite image after all of the smaller images have been captured, typically by software on a computer separate from the imager used to capture the smaller images. If adjacent smaller images cannot be sufficiently aligned (e.g., because the as-captured smaller images were vastly askew or do not share a sufficient overlap area), the resulting composite image may be unsatisfactory. Therefore, a method and system enabling a user to better align small images used to form a composite image is desirable.

DETAILED DESCRIPTION OF THE DISCLOSED EMBODIMENTS

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely an example. The sequence of steps is not limited to that set forth herein and may be changed or reordered, with the exception of steps necessarily occurring in a certain order.

Higher-quality composite images can be achieved by better alignment of constituent images captured during imaging. Images can be better aligned during imaging by superimposing on a display (e.g., the display on a digital camera) a portion of a previously captured image over a preview of the next image to be captured (or, conversely, a portion of the preview of the next image could be superimposed over the previously captured image). The imager can then be adjusted as a user views the display to bring the images into better alignment. For example, a user operating a digital camera would capture a first image (e.g., by pressing a shutter release button). A portion of the first image would be overlaid atop a live preview of a second image. The user could then pan or rotate the digital camera to bring the first and second images into better alignment before depressing the shutter button again to capture the second image.

Figure 1:
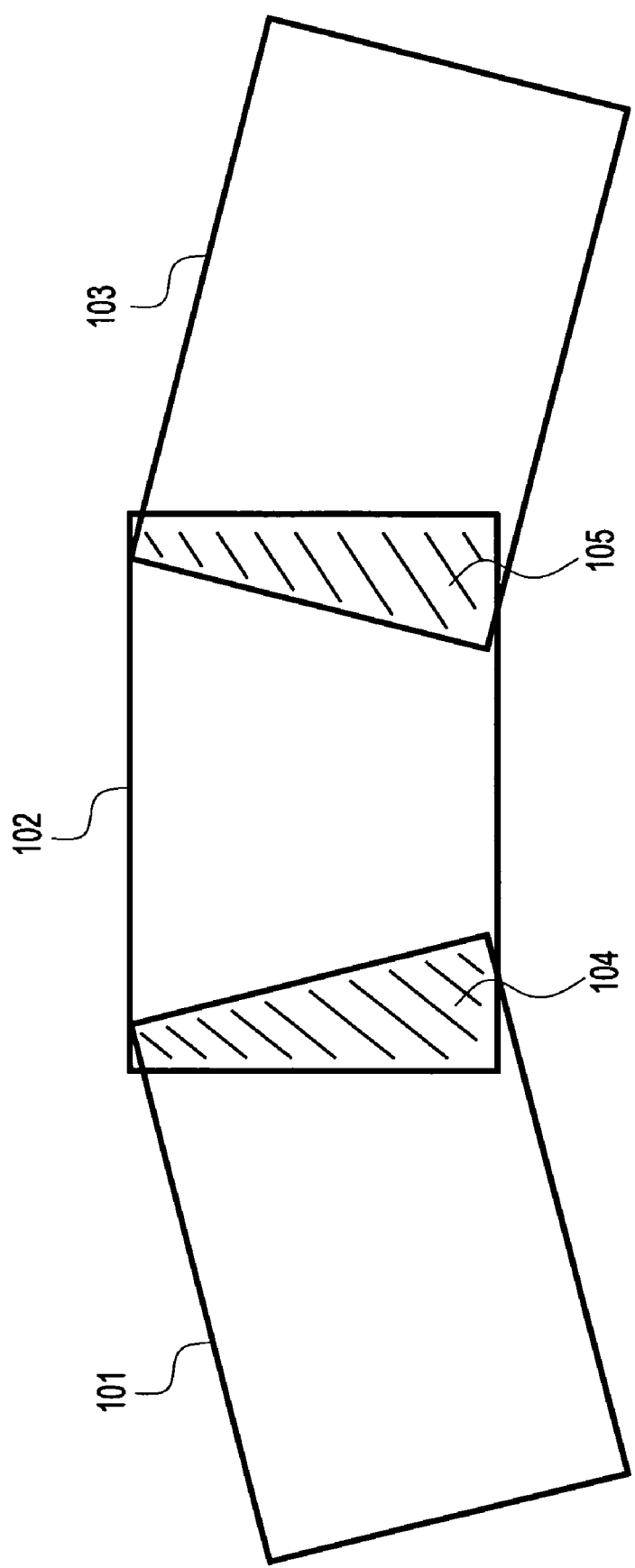
FIG. 1 illustrates a composite image comprising three smaller images with overlapping areas.
Figure 2:
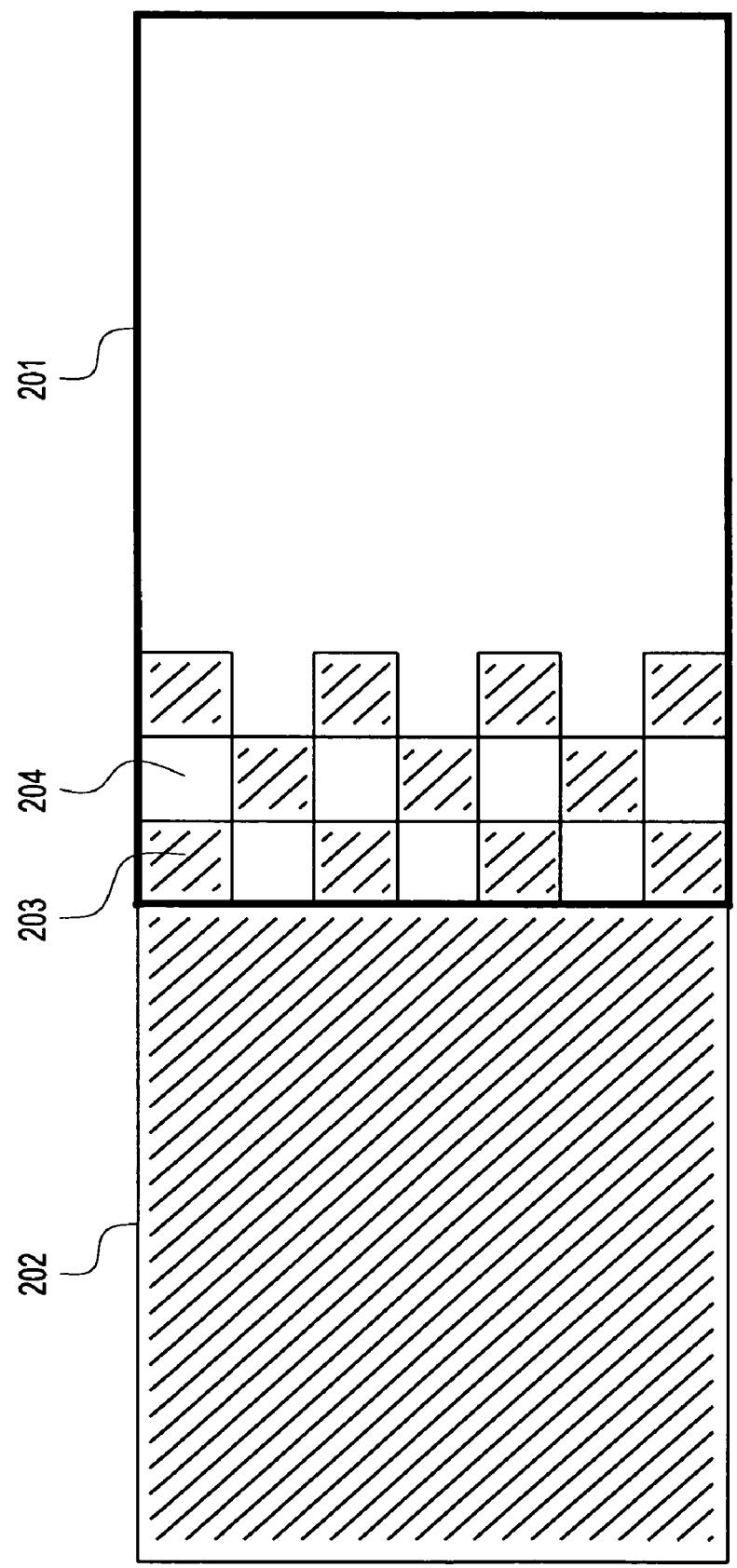
FIG. 2 illustrates a method of aligning two images in accordance with a disclosed embodiment.

FIG. 2 illustrates an arrangement of first and second image portions in accordance with a disclosed embodiment. Image 202 is a previously captured first image. Image 201 is the current image (e.g., the image sought to be aligned with the first image). Continuing the digital camera example, the current image 201 represents the image that will be captured when the shutter release button is depressed. A live preview of image 201 shown on a display of the digital camera can be continuously updated based on the position of the camera. Typically, the live preview would be displayed on an LCD or other monitor on the rear of the digital camera or in the digital camera's viewfinder. The thick line surrounding the current image 201 defines the area preferably displayed on the monitor.

The checkerboard pattern displayed on the left side of current image 201 corresponds to the intended overlap area between previously captured image 202 and current image 201. The checkerboard pattern consists of tiles 203 and "clear" areas 204. The tiles 203, which are denoted by diagonal line shading, each comprise a group of pixels from the previously captured image 202 overlaid atop the live preview of the current image 201. The clear areas 204 each comprise a group of pixels from the live preview of the current image that "show through" in-between the tiles 203. A user can bring the images 201 and 202 into better alignment by adjusting the digital camera until the portions of the scene in previously captured tiles 203 appear to be aligned with the portions of the scene in areas 204. Once the user is satisfied with the alignment, the current image can be captured (e.g., by depressing the shutter release button).

In an alternative embodiment, images 201 and 202 could be reversed (i.e., image 201 could be the previously captured image and image 202 could be a live preview representing the image that will be captured when the shutter released button is depressed). In this embodiment, tiles 203 could be continuously updated with the live preview image while tiles 204 would statically display the previously captured image.

Figure 3A:
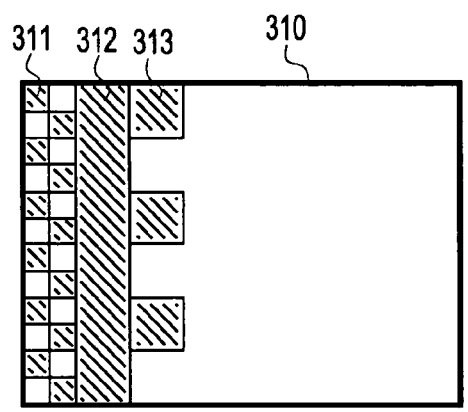
FIGS. 3A-D illustrate methods for aligning two images in accordance with alternative embodiments.
Figure 3B:
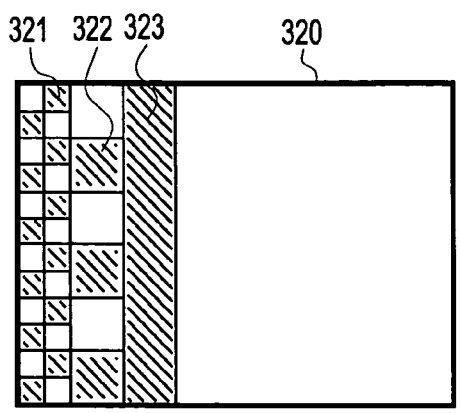

Although FIG. 2 illustrates a simple checkerboard pattern with alternating tiles of pixels from a previously captured image and areas of the current image, other patterns are possible. FIGS. 3A-D illustrate four of the many possible alternative patterns. FIG. 3A comprises a current image 310 overlaid with tiles 311, 312, 313 each comprising a group of pixels from a previously captured image. A first column in the intended overlap area comprises relatively small tiles 311 arranged in a checkerboard pattern. A second column in the intended overlap area comprises a single large tile 312. A third column in the intended overlap area comprises several medium-size tiles 313 larger than those in the first column, but smaller than the tile 312 in the second column. The medium-size tiles 313 in the third column are arranged in a "saw tooth" pattern (i.e., one column of a checkerboard pattern). FIG. 3B illustrates an image 320 and similar tiles 321, 322, 323 as FIG. 3A, but arranged with the second and third columns swapped.

Figure 3C:
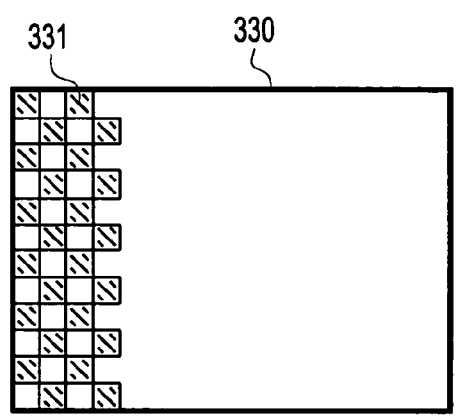
Figure 3D:
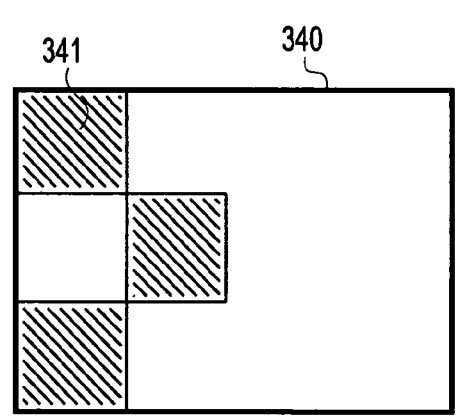

FIG. 3C illustrates a similar checkerboard pattern as FIG. 2. However, the tiles 331 overlaid on the image 330 of FIG. 3C are smaller (i.e., comprise fewer pixels) and more numerous. In one embodiment, the tiles 331 could comprise a few pixels or even a single pixel. Tiles 331 each comprising only a single pixel can be used to simulate a partially transparent second image at reduced computational complexity compared to conventional methods that compute new "merged" pixel values based on a combination of pixel values from the first and second images. FIG. 3D illustrates yet another embodiment of the checkerboard pattern wherein the tiles 341 overlaid on the image 340 are larger (i.e., each tile 341 comprises more pixels) and less numerous than those of FIGS. 2 and 3C.

Figure 4A:
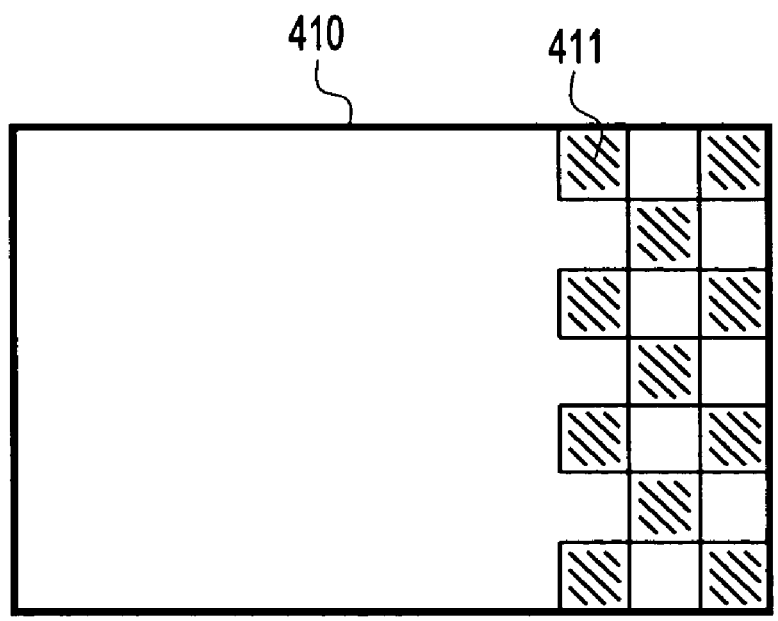
FIGS. 4A and 4B illustrate methods for aligning two images in accordance with additional alternative embodiments.
Figure 4B:
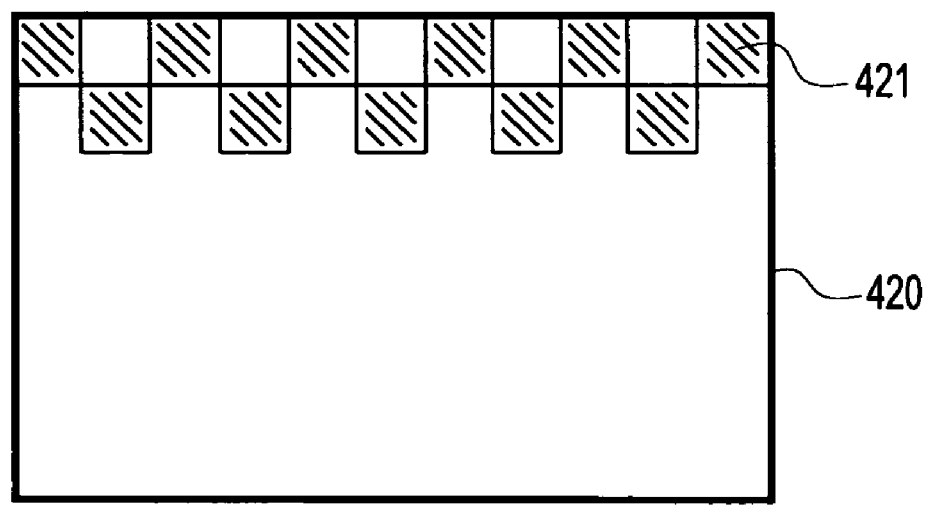

FIG. 4A illustrates an alternative positioning of tiles 411, each comprising a group of pixels from a previously captured frame, within an image 410. More specifically, the tiles 411 are located on the right side of the image 410 rather than the left side, as illustrated in FIGS. 2 and 3A-D. This configuration might be useful, for example, if images comprising the composite image are captured from right-to-left, rather than from left-to-right. Similarly, FIG. 4B illustrates tiles 421 positioned at the top of an image 420. This configuration might be useful, for example, if images to be used in creating the composite image are captured from top-to-bottom. Of course, tiles could also be positioned at the bottom of an image to facilitate capture of images comprising the composite image from bottom-to-top.

Figure 5:
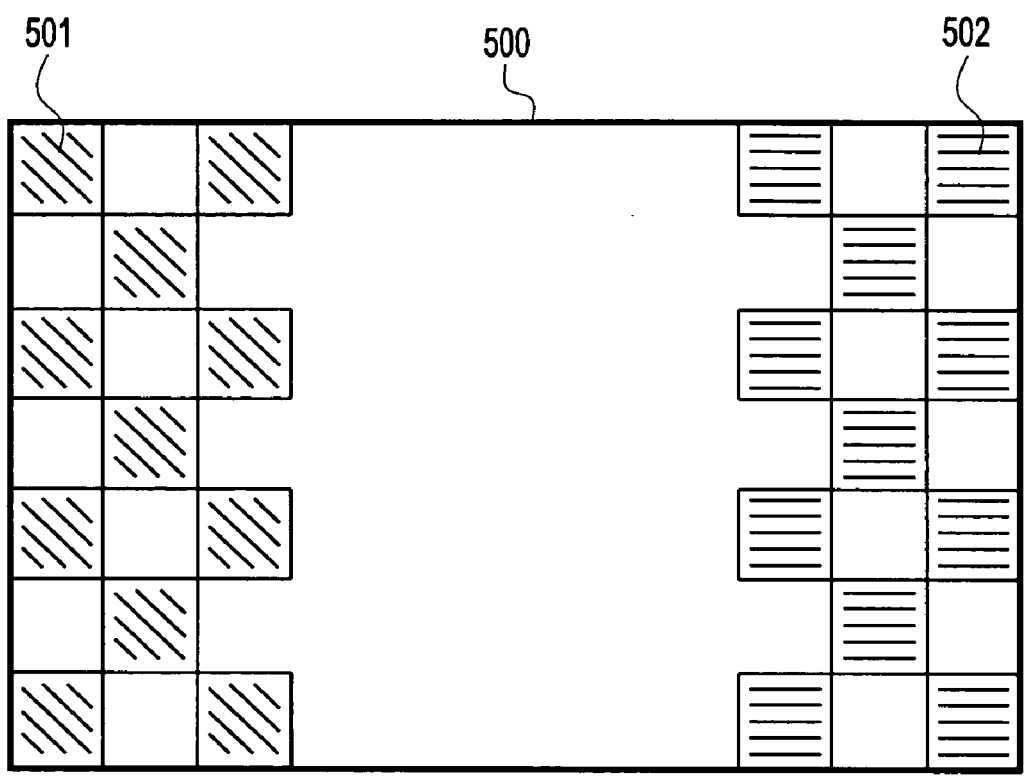
FIG. 5 illustrates a method of aligning three images in accordance with a disclosed embodiment.

FIG. 5 illustrates an alternative embodiment in which more than two images can be aligned simultaneously. In the illustrated embodiment, three images—a left image 501, a center image 500 and a right image 502—are aligned. Of course, other embodiments could comprise any number of images and the images need not be arranged linearly but could also include images to the top and bottom, as described above with reference to FIGS. 4A and 4B. Any one or more of the images could be live preview images. For example, in the illustrated embodiment, center image 500 could be a previously captured image, while left image 501 is a live preview from a first camera, and right image 502 is a live preview from a second camera. This could be implemented, for example, by streaming live preview images from the first and second cameras to personal computer or other processor system via a communications medium. A processor within the personal computer could then combine the two live preview stream with the previously captured image to form the display illustrated in FIG. 5, which could then be displayed to a user (e.g., on a conventional LCD monitor attached to the personal computer). The first camera can be adjusted to bring the left live preview image 501 into better alignment with the previously captured center image 500. Similarly, the second camera can be adjusted to bring the right live preview image 502 into better alignment with the previously captured center image 500.

Although many of the tiles in FIGS. 2, 3A-D, 4A, 4B, and 5 are illustrated as squares, other configurations are possible. For example, the tiles might be rectangular (i.e., comprise a block of pixels arranged in an M×N pattern where M does not equal N). In one embodiment, the tiles have an aspect ratio similar to that of the image. For example, a typical photograph has an aspect ratio of about 3-to-2 (i.e., a width of 3 units and height of 2 units). Tiles could be configured similarly (e.g., 30 pixels in width and 20 pixels in height).

Several tile patterns are expressly disclosed herein, but many other arrangements are possible. In a disclosed embodiment, a user can select from among a plurality of pre-defined tile patterns, or even create a custom tile pattern, for use when aligning images during imaging. For example, a digital camera might allow a user to select a pattern via a toggle switch, a configuration menu, a touch screen, or a button for changing patterns before or during imaging.

To aid users in distinguishing pixels of a previously captured image from pixels of the current image, the tiles (e.g., tiles 203 of FIG. 2) can be adjusted. For example, tiles associated with a previously captured image could be darkened or lightened. Alternatively, the color of tiles could be altered (e.g., tinted red). In an example embodiment operating in the RGB color space with 8 bits per color channel, each of the red (R), green (G), and blue (B) values associated with pixels in the tiles could be reduced by 40. For example, a medium green pixel in the previously captured image having an RGB value of (100, 250, 50) could be displayed as having an RGB value of (60, 210, 10), which corresponds to a darker shade of green. The color of the pixel values can be adjusted (i.e., the tiles can be "tinted") by changing only one or two of the RGB values, or by changing the RGB values in different amounts.

Figure 6:
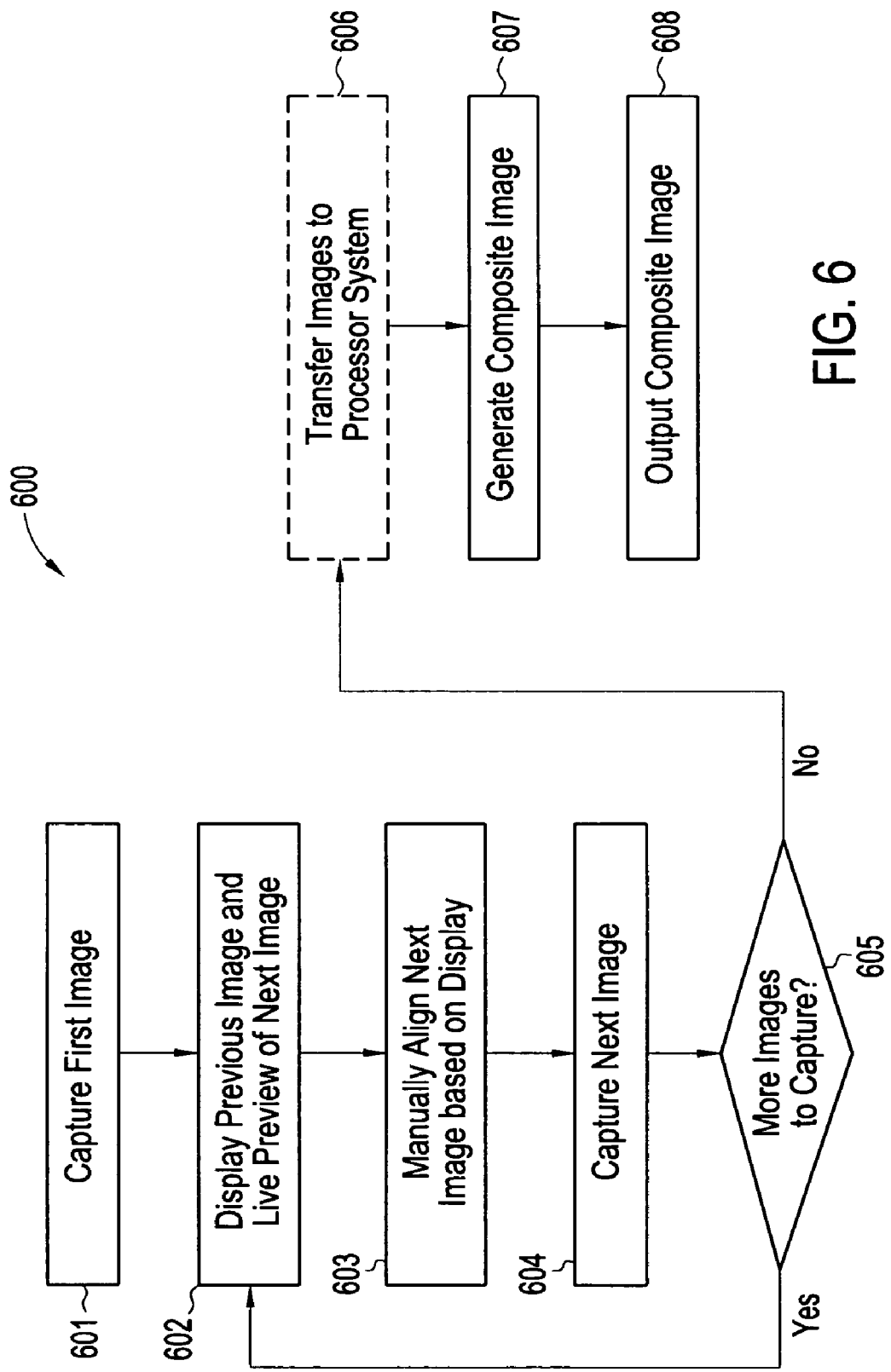
FIG. 6 is a flowchart illustrating a method of aligning an arbitrary number of images in accordance with a disclosed embodiment.

FIG. 6 illustrates a method 600 of aligning an arbitrary number of images in accordance with a disclosed embodiment. At step 601, a first image is captured. In a typical example involving a digital camera, step 601 might involve a user framing an image in the camera's viewfinder or display area, then depressing the shutter release button. At step 602, the previous image and a live preview of the next image are displayed (e.g., in the display area of the digital camera). For example, a portion of the previous image could be displayed in a checkerboard pattern atop a live preview of the next image, as described above with reference to FIG. 2. Of course, any other pattern, for example those described above with reference to FIGS. 3A-D and 4A-B could also be used.

At step 603, the user aligns the previous and next images based on the display (e.g., by panning or rotating the digital camera and monitoring the resulting change in alignment). Once the next and previous images are satisfactorily aligned (e.g., by the user's subjective assessment based on the display), the second image is captured at step 604. The user can indicate satisfactory alignment by, for example, depressing a shutter release button. At step 605, it is determined whether additional images are to be captured (e.g., by the user pressing an appropriate button on the digital camera). If more images are to be captured, then the method continues at step 602 with alignment of the next image.

Once all images have been captured, as determined at step 605, a composite image can be generated from the captured images. For example, at step 606, the captured images can be transferred to a processor system that generates the composite image at step 607 using known compositing techniques and outputs the composite image at step 608. Steps 607 and 608 could be performed by the image processor of an imaging system that captures the images (e.g., a digital camera), or by a separate processor system that receives and processes the captured images (e.g., a personal computer).

In an alternative embodiment, a composite image can be generated after each of the second and subsequent images is captured (i.e., after step 604). This intermediate composite image could then be used as the previous image displayed at step 602. As noted above, the composite image can be generated by the imaging device (e.g., the digital camera) that captures the images or by another processor system (e.g., a personal computer) that receives the captured images from the imaging device. If the composite image is to be generated by another processor system, then the captured images are transferred (e.g., via USB, FireWire, WiFi, portable memory card, or another other known data transfer technology) from the imaging device to the processor system at optional step 606. The composite image is output to a storage medium (e.g., printed, burned to a CD, or stored in a computer memory, such as RAM or a hard disk) at step 608. If the user is not satisfied with the composite image (e.g., because the captured images are not sufficiently aligned), the method can be repeated (i.e., begin again at step 601) to generate another composite image.

Figure 7:
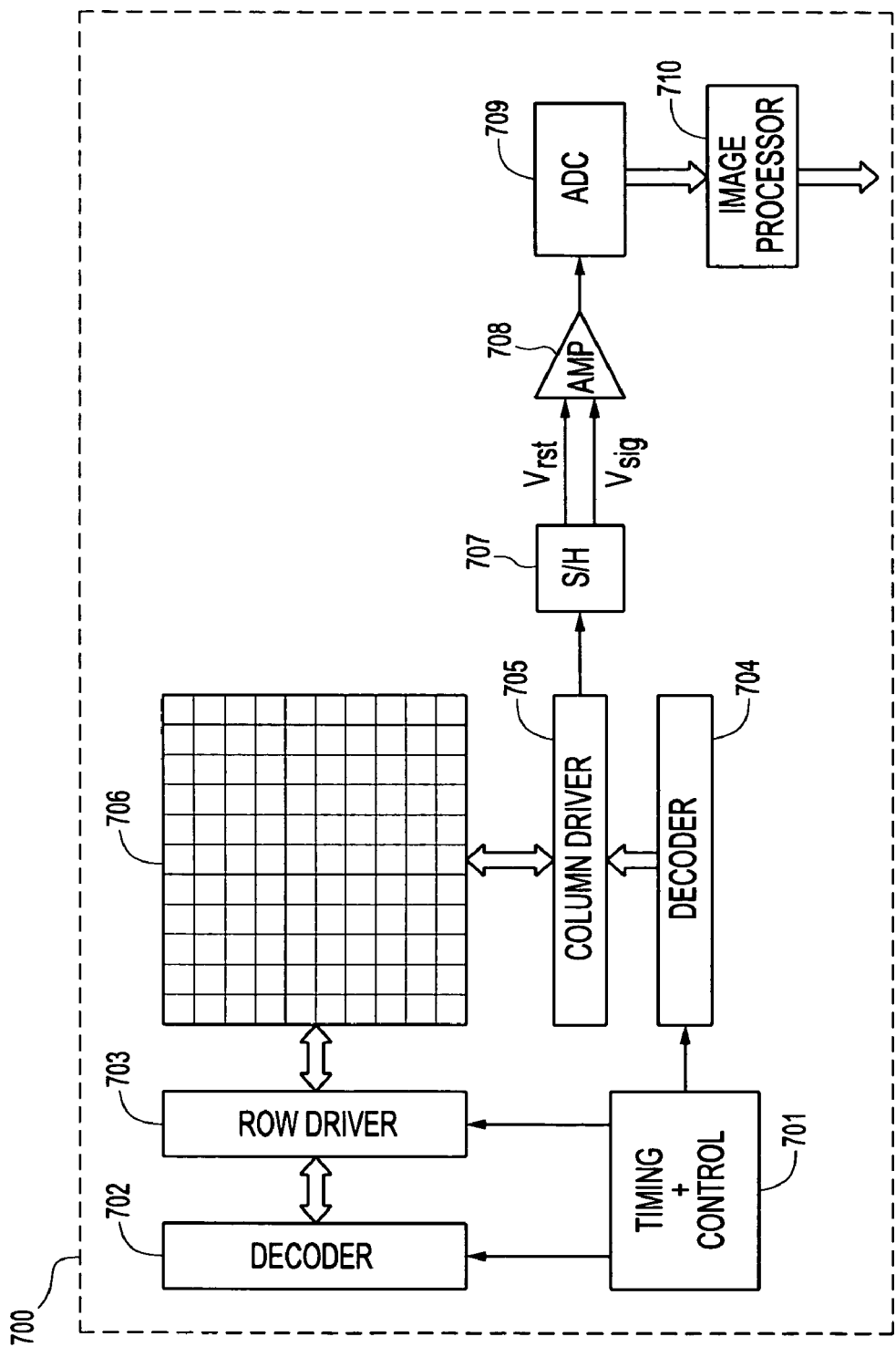
FIG. 7 is a partial top-down block diagram of an imager and associated readout circuitry constructed in accordance with a disclosed embodiment.

The following paragraphs describe how to implement embodiments of the disclosure in an imager and a processor system. FIG. 7 is a partial block diagram view of an imager 700 (e.g., a CMOS imager) and associated read-out circuitry constructed in accordance with an embodiment disclosed herein. Although FIG. 7 illustrates a CMOS imager and associated read-out circuitry, embodiments may include other types of imagers, for example a CCD imager.

When the imager 700 is operated to capture light, the pixel cells in each row of pixel array 706 are all turned on at the same time by a row select line, and the signals of the pixel cells of each column are selectively output onto output lines by respective column select lines. A plurality of row and column select lines are provided for the array. The row lines are selectively activated in sequence by a row driver 703 in response to a row address decoder 702 and the column select lines are selectively activated in sequence for each row activation by a column driver 705 in response to a column address decoder 704. Thus, row and column addresses are provided for each pixel cell of the pixel array 706. The imager 700 is operated by the timing and control circuit 701, which controls the address decoders 702, 704 for selecting the appropriate row and column select lines for pixel cell read-out, and the row and column drivers 703, 705, which apply driving voltage to the drive transistors of the selected row and column lines.

In a CMOS imager, the pixel cell output signals typically include a pixel reset signal $V_{rst}$ taken off of a floating diffusion region (via a source follower transistor) when it is reset and a pixel image signal $V_{sig}$, which is taken off the floating diffusion region (via the source follower transistor) after charges generated by an image are transferred to it. The $V_{rst}$ and $V_{sig}$ signals for each pixel of pixel array 706 are read by a sample and hold circuit 707 and are subtracted by a differential amplifier 708 that produces a difference signal ($V_{rst}-V_{sig}$) for each pixel cell of pixel array 706, which represents the amount of light impinging on the pixel cell. This signal difference is digitized by an analog-to-digital converter (ADC) 709. The digitized pixel signals are then fed to an image processor 710 which processes the pixel signals and forms a digital image output. It is also possible to have separate driver and read-out circuits for each sub-array with the pixel output signal from the ADC 709 of each sub-array feeding into a common image processor circuit 710. As depicted in FIG. 7, the imager 700 is formed on a single semiconductor chip, although other configurations are possible. As known in the art, imager 700 can provide continuous frames of images, with one frame being captured when a shutter release button is pressed. Thus, after one image is captured by the imager 700, the next series of preview frames can be provided to a display device for superimposition of the captured image, as described above.

Figure 8A:
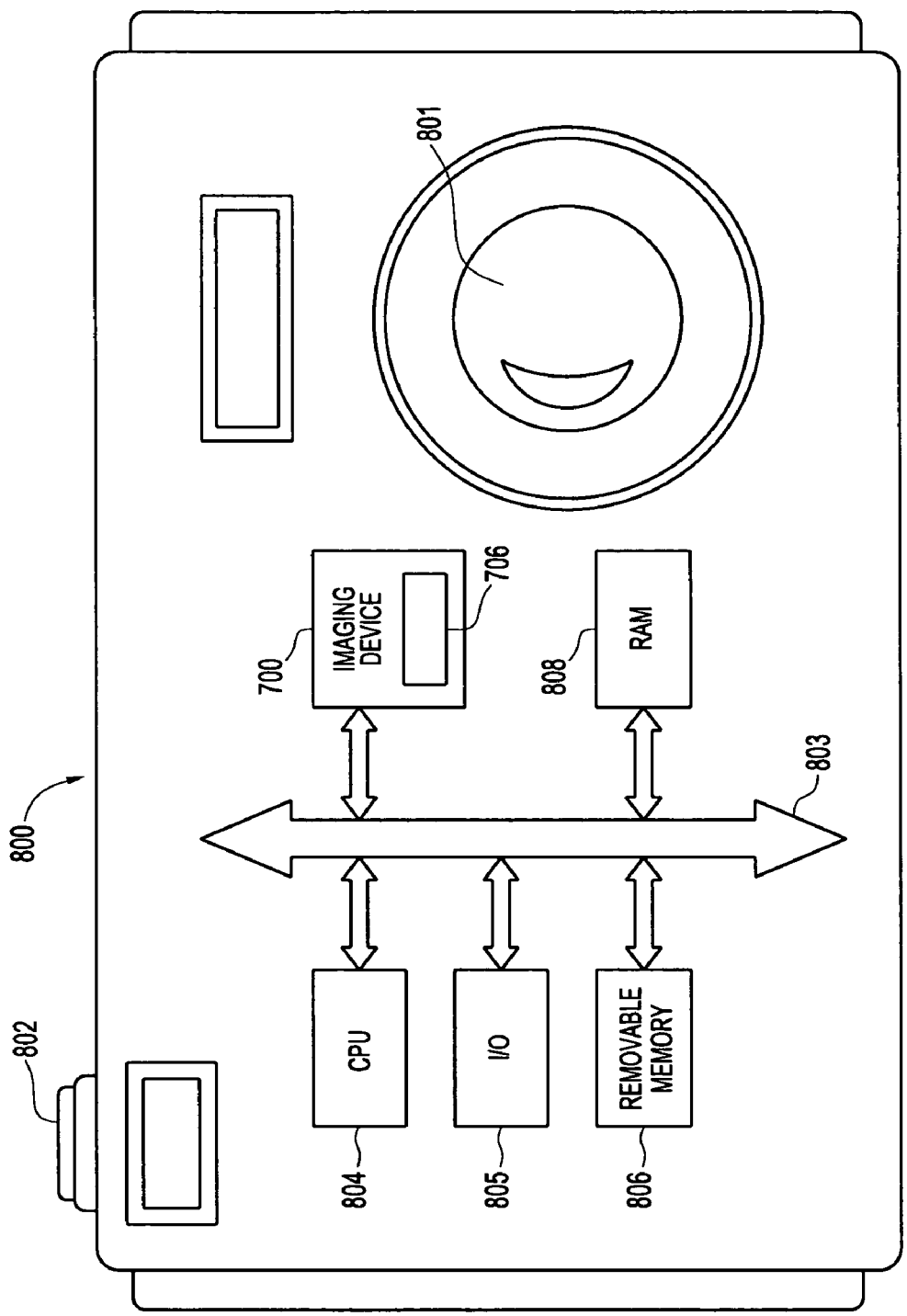
FIGS. 8A and 8B are front and back views, respectively, of a digital camera constructed in accordance with a disclosed embodiment.

FIG. 8A depicts a processor system 800 constructed in accordance with a disclosed embodiment. In the illustrated embodiment, the processor system 800 is a digital camera, which comprises the imager 700 described above. The system 800 also includes a lens 801 for focusing an image on the pixel array 706 of imaging device 700. System 800 also comprises the CPU 804, such as a microprocessor that controls camera functions and image flow, and communicates with an input/output (I/O) device 805 over a bus 803. The imaging device 700 can communicate with the CPU 804 over the bus 803. The system 800 also includes random access memory (RAM) 808, and can include removable memory 806, such as flash memory, which also communicates with the CPU 804 over the bus 803. The imaging device 700 may be combined with the CPU 804 on a single chip or may be implemented on separate chips.

Figure 8B:
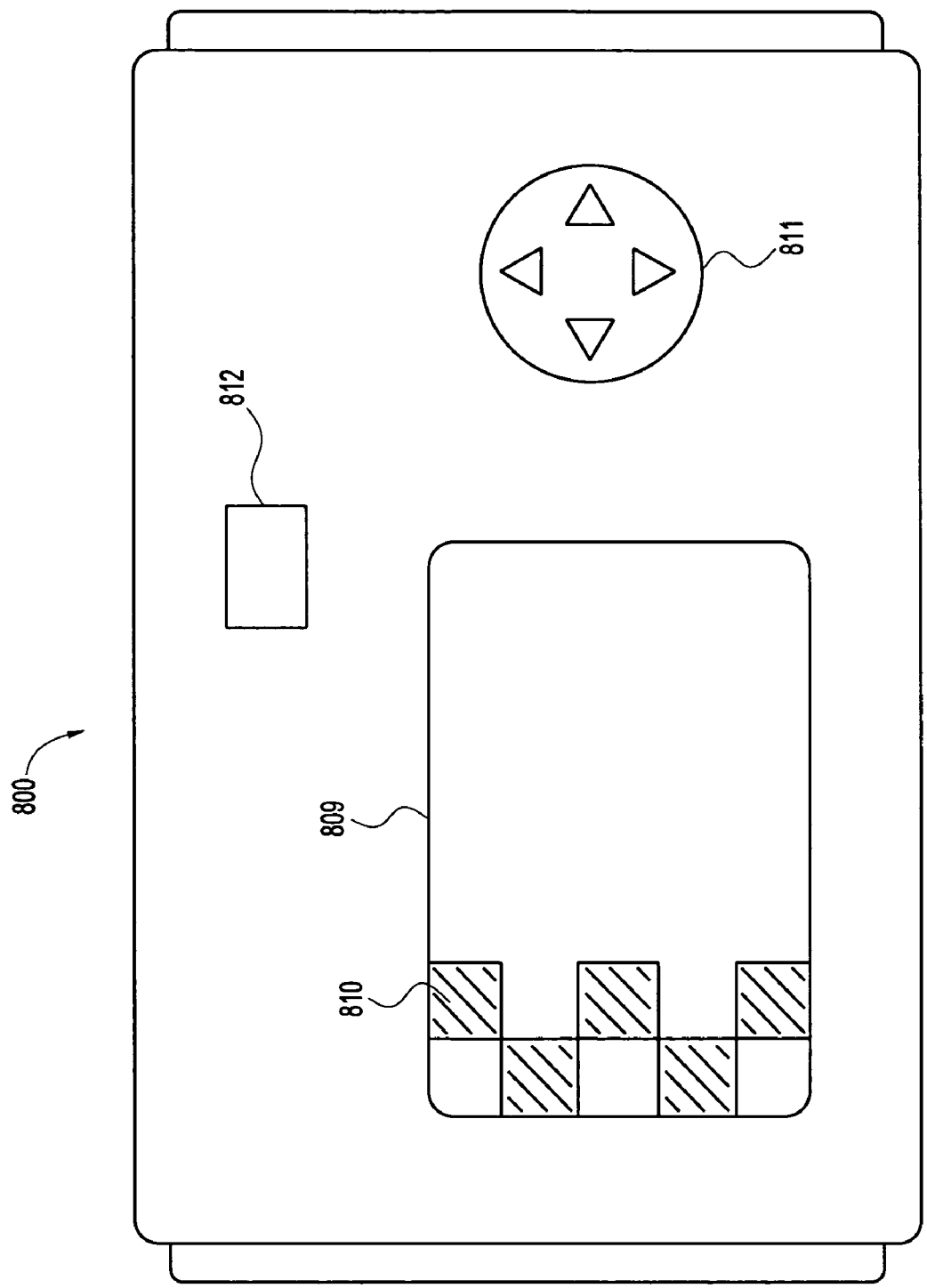

FIG. 8B illustrates the rear of the digital camera illustrated in FIG. 8A. In addition to elements illustrated in FIG. 8A, the digital camera 800 comprises a display 809 used to display an alignment preview image, generated from a captured image and preview images from imaging device 700, to a user. Alternatively or in addition, an alignment preview image could be displayed in a viewfinder 812. The digital camera 800 can also include a input device, such as directional switch 811, to facilitate user input. For example, a user could use the input device 811 to select among a plurality of tile patterns available for use in the alignment preview image. In the illustrated embodiment, tiles 810 arranged in a checkerboard pattern are shown along the left side of the display. Tiles 810 could each comprise a group of pixels from a previously captured image while the remainder of the display comprises pixels from a preview of a next image to be captured. Of course, many other tile arrangements as possible, as described above. By looking at the display, a user can adjust the pan and tilt of the digital camera as necessary to bring the images into better aligned. Once the images are satisfactorily aligned, the user can capture the second image by, for example, pressing the shutter release button 802 illustrated in FIG. 8A.

Continuing a description of an example embodiment in which the processor system 800 is a digital camera, an image processor (e.g., image processor 710 illustrated in FIG. 7) typically receives pixel signal values from a pixel array 706 and associated readout circuitry. The image processor combines many pixel signal values to form an image. The image can then be transferred, (e.g., via bus 803 illustrated in FIG.

8A) to a memory (e.g., RAM 808). By repeating the process, the pixel array 706, readout circuitry, and image processor 710 can capture additional images. The CPU 804 can generate an alignment preview image by combining one or more captured images with a preview image, as described above, by reading the images out of RAM 808 or receiving them directly from the imager 700 via the bus 803. The alignment preview image can then be shown to a user on the display 809 illustrated in FIG. 8B. The CPU 804 can continuously update the alignment preview image with newly captured images received from the image processor 710 to illustrate the effects of imager motion to the user in real-time.

In another embodiment, the system 800 is a personal computer comprising a CPU 804, which communicates with an I/O device 805 and RAM 808 over the bus 803. In this embodiment, the system 800 does not necessarily include an imaging device 700. Rather, digital pixel values can be transferred from another device (e.g., a digital video camera) via the I/O device 805, which might be, for example, a USB port, a memory card reader, a network port, a parallel port, a serial port, a FireWire port, a floppy disk drive, an optical disk drive, or a wireless transceiver. For example, when an first image is captured, the corresponding digital pixel values can be transferred to the personal computer 800 via the I/O device 805. A live preview of the next image could be streamed (e.g., as a streaming MPEG or RealMedia video) to the personal computer 800 via the I/O device 805. The CPU 804 can generate a live preview image based on the digital pixel values received via the I/O device 805 (e.g., by superimposing pixel values associated with the live preview on the captured image).

The alignment preview image can be shown to the user on a display associated with the personal computer 800 (e.g., a conventional LCD monitor), such as described above with reference to FIG. 2. The user can then adjust the source of the digital pixel values (e.g., the digital video camera) either directly or, if the source is remote, then via remote control over a communications network such as the Internet. Once the user is satisfied with the alignment, the next image is captured and associated digital pixel values are transferred to the personal computer 800 via the I/O device 805. The image can then be stored in a memory of the personal computer 800 (e.g., the RAM 806, the removable memory 806, or a hard disk drive). The CPU 804 can generate a composite image based on the images stored in the memory of the personal computer 800 and store the resulting composite image in the memory or output it to another medium (e.g., a conventional LCD display, removable media, or a printer) or both.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the claimed invention is not to be seen as limited by the foregoing description, but is only limited by the scope of the attached claims.

What is claimed as new and desired to be protected by Letters Patent of the United States is:

1. A method of aligning digital images, the method comprising:
    capturing a first image;
    displaying a preview of a portion of a second image along with a portion of the first image;
    aligning the preview of the portion of the second image and the portion of the first image; and
    capturing the second image,
    wherein the portion of the first image is superimposed over the preview of the portion of the second image and wherein pixels of the superimposed portion of the first image are adjusted to distinguish them from pixels of the preview of the portion of the second image.

2. The method of claim 1, wherein the superimposed portion of the first image comprises a plurality of tiles arranged in a checkerboard pattern.

3. The method of claim 2, wherein the checkerboard pattern consists of alternating first and second regions, the first regions consisting of pixels of the first image and the second region consisting of pixels of the preview of the second image.

4. The method of claim 3, wherein the regions are rectangles.

5. The method of claim 3, wherein each of the first and second regions consists of one pixel.

6. The method of claim 1, wherein the adjustment comprises altering the brightness of the pixels in the superimposed portion of the first image.

7. The method of claim 1, wherein the adjustment comprises altering the color of the pixels in the superimposed portion of the first image.

8. The method of claim 1, wherein the preview of the portion of the second image is continuously refreshed.

9. The method of claim 1, wherein the aligning step comprises adjusting a view of an imager before the second image is captured.

10. The method of claim 9, wherein the aligning step comprises rotating and panning the imager to better align the first and second images.

11. The method of claim 1, further comprising generating a composite image based on the captured first and second images.

12. A method of forming a composite image, the method comprising:
    capturing a first image;
    displaying a live preview of a second image as a background image;
    displaying a pattern of pixels from the first image over portions of the live preview of the second image, wherein the pattern of pixels from the first image are adjusted to distinguish them from pixels of the live preview of the second image;
    adjusting the live preview of the second image to better align the first image and the live preview of the second image; and
    capturing the better aligned second image.

13. The method of claim 12, further comprising updating the display of the live preview of the second image to illustrate a result of the adjusting step.

14. The method of claim 12, wherein the live preview of the second image is continuously refreshed.

15. The method of claim 12, wherein the pattern of pixels from the first image is displayed over a left portion of the live preview of the second image.

16. The method of claim 12, wherein the pattern of pixels from the first image comprises a first column consisting of tiles of pixels from the first image arranged in a checkerboard pattern.

17. The method of claim 16, wherein the pattern of pixels from the first image further comprises a second column consisting only of pixels from the first image.

18. The method of claim 12, wherein the adjusting step comprises moving an imager configured to capture the first image and the better aligned second image.

19. The method of claim 12, further comprising generating a composite image by combining the first image and the better aligned second image.

20. A method of aligning a plurality of images for use in generating a composite image, the method comprising:
receiving first digital pixel values representative of a first of the plurality of images;
receiving second digital pixel values representative of a preview of a second of the plurality of images;
displaying tiles comprising at least some of the first digital pixel values atop at least some of the second digital pixel values;
adjusting the displayed first digital pixel values to distinguish them from the displayed second digital pixel values; and
adjusting an imager to better align the first of the plurality of images and the preview of the second of the plurality of images based on the displayed digital pixel values.

21. The method of claim 20, further comprising:
receiving third digital pixel values representative of the second of the plurality of images; and
combining at least some of the first digital pixel values with at least some of the third digital pixel values to generate the composite image.

22. The method of claim 20, wherein adjusting the displayed first digital pixel values comprises darkening or lightening the displayed first digital pixel values.

23. The method of claim 20, wherein adjusting the displayed first digital pixel values comprises tinting the displayed first digital pixel values.

24. The method of claim 20, wherein the tiles are arranged in a checkerboard pattern.

25. The method of claim 20, wherein the second digital pixel values are continuously refreshed to reflect the adjustments to the imager.

26. The method of claim 20, wherein the preview of the second of the plurality of images is displayed as a background image and portions of the first of the plurality of images are displayed in place of portions of the preview of the second of the plurality of images.

27. An imaging system, comprising:
a pixel array;
a display;
an imaging circuit configured to:
receive pixel values defining a first captured image and a preview of a second image from the pixel array;
generate an alignment preview image comprising first regions consisting of pixel values derived from the first captured image and second regions consisting of pixel values derived from the preview of the second image, wherein pixel values of the first regions are adjusted to distinguish them from pixel values of the second regions;
display the alignment preview image on the display;
update the displayed alignment preview image based on new pixel values defining an updated preview of the second image received from the pixel array; and
capture the second image upon command of a user in response to the degree of alignment of the first image and the preview of the second image.

28. The imaging system of claim 27, wherein the command comprises depressing a shutter release button.

29. The imaging system of claim 27, further comprising an input device configured to allow the user to select among a plurality of first and second region patterns.

30. The imaging system of claim 27, wherein the imaging circuit is further configured to:
generate a composite image comprising the captured first and second images.

31. A processor system, comprising:
an input device configured to receive pixel values; and
a processor configured to:
receive pixel values associated with a first captured image and a second image from the input device;
generate an alignment preview image comprising a portion of the first captured image and a portion of the second image, wherein pixel values associated with the portion of the first captured image are adjusted to distinguish them from pixel values associated with the portion of the second image in the alignment preview image;
receive updated pixel values associated with the second image;
update the alignment preview image based on the updated pixel values; and
store the updated second image in a memory in response to a user command to capture the second image.

32. The system of claim 31, wherein the processor is further configured to generate a composite image based on the stored first and second images.

* * * * *